(12) United States Patent
Pan

(10) Patent No.: US 12,514,669 B2
(45) Date of Patent: Jan. 6, 2026

(54) SURGICAL MICROSCOPE SYSTEM AND CORRESPONDING SYSTEM, METHOD AND COMPUTER PROGRAM

(71) Applicant: Leica Instruments (Singapore) Pte. Ltd., Singapore (SG)

(72) Inventor: Jiahao Pan, Singapore (SG)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 545 days.

(21) Appl. No.: 17/906,749

(22) PCT Filed: Mar. 17, 2021

(86) PCT No.: PCT/EP2021/056815
§ 371 (c)(1),
(2) Date: Sep. 20, 2022

(87) PCT Pub. No.: WO2021/185907
PCT Pub. Date: Sep. 23, 2021

(65) Prior Publication Data
US 2023/0190401 A1 Jun. 22, 2023

(30) Foreign Application Priority Data

Mar. 20, 2020 (DE) .......................... 102020107765.3

(51) Int. Cl.
*A61B 90/20* (2016.01)
(52) U.S. Cl.
CPC .................................. *A61B 90/20* (2016.02)
(58) Field of Classification Search
CPC .......... A61B 90/20; A61B 2017/00017; A61B 2017/00132; A61B 2090/3612; A61B 2090/506; A61B 90/361

(Continued)

(56) References Cited

U.S. PATENT DOCUMENTS 5,667,186 A * 9/1997 Luber .................... G02B 7/001
248/550
2016/0100107 A1* 4/2016 Nakamura ............... H04N 5/77
348/77

(Continued)

FOREIGN PATENT DOCUMENTS

CN 107438413 A 12/2017
CN 109715106 A 5/2019

(Continued)

*Primary Examiner* — Carl H Layno
*Assistant Examiner* — Mary Grace Schlueter
(74) *Attorney, Agent, or Firm* — 2SPL Patent Attorneys PartG mbB; Yong Beom Hwang

(57) ABSTRACT

Examples relate to a system, a method and a computer program controlling a recording device of a surgical microscope system, and to a corresponding surgical microscope system. The system comprises one or more processors and an interface. The system is configured to obtain input data from one or more sensors or actors of the surgical microscope system via the interface. The system is configured to detect a start or an end of a surgery based on the input data. The surgery involves a use of the surgical microscope system. The system is configured to provide a control signal to the recording device of the surgical microscope system via the interface based on the surgery's detected start/end. The input data may be used to detect the start or end of a surgical procedure, which may in turn trigger the activation or deactivation of the recording performed by the recording device.

14 Claims, 5 Drawing Sheets

(58) Field of Classification Search
USPC .............................. 606/1; 600/101, 118, 109
See application file for complete search history.

(56) References Cited

U.S. PATENT DOCUMENTS

| | | |
|---|---|---|
| 2018/0122924 A1 | 5/2018 | Niu et al. |
| 2018/0263715 A1 | 9/2018 | Maeda et al. |
| 2018/0322949 A1 | 11/2018 | Mohr |
| 2019/0125319 A1 | 5/2019 | Enoki |

FOREIGN PATENT DOCUMENTS

| | | | |
|---|---|---|---|
| DE | 69716018 T2 | 2/2003 | |
| DE | 102016217628 A1 | 3/2018 | |
| EP | 1870827 A1 | 12/2007 | |
| JP | 0716239 | 1/1995 | |
| JP | 2001061776 A * | 3/2001 | |
| JP | 2002065600 A | 3/2002 | |
| JP | 2008000282 A | 1/2008 | |
| JP | 2014229972 A | 12/2014 | |
| JP | 2018047088 A | 3/2018 | |
| WO | WO-2018055950 A1 * | 3/2018 | ........... A61B 90/361 |
| WO | 2019181554 A1 | 9/2019 | |
| WO | WO-2021090868 A1 * | 5/2021 | ............. A61B 34/74 |

\* cited by examiner

SURGICAL MICROSCOPE SYSTEM AND CORRESPONDING SYSTEM, METHOD AND COMPUTER PROGRAM

TECHNICAL FIELD

Examples relate to a system, a method and a computer program for controlling a recording device of a surgical microscope system, and to a corresponding surgical microscope system.

BACKGROUND

A major focus in the effort for improving the quality of surgical procedures is the recording of the surgical procedures by a camera, which may be integrated into the surgical microscope. In some countries, such as Singapore, such video recording is mandatory for all surgeries. As more and more surgeries are being performed, e.g. in Ophthalmology, or more specifically cataract surgery, delays may be introduced due to the handling of the recording, as the surgeon may manually start and stop the recording, either through a footswitch, or with the help of nurses.

SUMMARY

There may be a desire for an improved concept for controlling a recording of a surgery.

This desire is addressed by the subject-matter of the independent claims.

Embodiments of the present disclosure are based on the finding, that a state of a surgical microscope system comprising a surgical microscope may be analyzed to find out whether the surgical microscope is being used for a surgical procedure, or whether the surgical microscope is not currently being used. For example, a vertical height of the surgical microscope above ground or above the patient may be indicative of the surgical microscope system being used. Additionally or alternatively, a parallelogram section of an arm of the surgical microscope system may have an active orientation (indicating that the surgical microscope is being used), placing the surgical microscope at a first position (e.g. above the patient), and a parked orientation (indicating that the surgical microscope system is not being used), placing the surgical microscope at a second position away from the patient. Additionally or alternatively, imaging sensor data of an imaging sensor of the surgical microscope may be used to determine whether the captured imaging sensor data is in focus (indicating that the surgical microscope is being used), or whether a patient is visible in the captured imaging sensor data (indicating that the surgical microscope is being used). Based on the detection, the recording may be controlled (i.e. automatically started and/or stopped). Using this measure, delays may be avoided, which may improve efficiency and turnover in the operating room, which may result in the ability to help more patients per day.

Embodiments of the present disclosure provide a system for controlling a recording device of a surgical microscope system. The system comprises one or more processors and an interface. The system is configured to obtain input data from one or more sensors or actors of the surgical microscope system via the interface. The system is configured to detect a start or an end of a surgery based on the input data. The surgery involves a use of the surgical microscope system. The system is configured to provide a control signal to the recording device of the surgical microscope system via the interface based on the detected start or end of the surgery. The input data may be used to detect the start or the end of a surgical procedure, which may in turn trigger the activation or deactivation of the recording being performed by the recording device.

In various embodiments, the input data comprises information on a position of an arm of the surgical microscope system. The system may be configured to detect the start or end of the surgery based on the information on the position of the arm. The position of the arm may be indicative of whether the surgical microscope is being used.

In embodiments, a surgical microscope of the surgical microscope system is attached to the arm of the surgical microscope system. The information on the position of the arm may comprise information on a vertical position of the surgical microscope. The system may be configured to detect the start or end of the surgery based on the information on the vertical position of the surgical microscope. For example, if the surgical microscope is brought to a lower vertical position (e.g. in close proximity to the surgical site), a start of the surgical procedure may be detected, if the surgical microscope is brought to a higher vertical position, an end of the surgical procedure may be detected. In other words, the system may be configured to detect the start of a surgery after the vertical position of the surgical microscope is lowered below a threshold. The system may be configured to detect the end of the surgery after the vertical position of the surgical microscope is increased above a threshold.

In some cases, the surgical microscope may be temporarily moved out of the way, and thus above the threshold, before the surgery is resumed. In such cases, a timer may be used to avoid shutting off the recording in the interim. For example, the system may be configured to detect the end of the surgery if the surgical microscope remains above the threshold for at least a pre-defined time interval.

To obtain a higher confidence level, not only the vertical height, but also the usage of the surgical microscope system may be analyzed. In general, surgical microscopes have a shallow depth of field. If the surgical microscope is unused, the object being viewed through the microscope may move out of focus, indicating that the surgical microscope is (at least temporarily) not being used. In other words, the input data may comprise imaging sensor data of an imaging sensor of the surgical microscope. The system may be configured to detect the end of the surgery if the surgical microscope remains above the threshold and the imaging sensor data is out of focus for at least a pre-defined time interval. The imaging sensor data may increase the confidence that the surgical microscope is currently not in use.

In various embodiments, the arm of the microscope system comprises a parallelogram section. The information on the position of the arm may comprise information on an orientation of the parallelogram section of the arm. The system may be configured to detect the start or end of the surgery based on the information on the orientation of the parallelogram section of the arm. For example, the parallelogram section of the arm may be moved between an active position/orientation and a parked position/orientation.

In general, there are (at least) two ways of determining the position of the arm. In some embodiments, sensor data of a sensor of the arm to determine the position of the surgical microscope (and thus orientation of the arm). For example, the one or more sensors or actors of the surgical microscope system may comprise a positioning sensor for determining the position of the arm (and thus the position of the surgical microscope). The system may be configured to obtain the information on the position of the arm from the positioning sensor. Alternatively, the arm may be a robotic arm. In this case, the state of the robotic arm may reflect the position of the robotic arm, and thus the position of the surgical microscope. In other words, the arm may be a robotic arm. The system may be configured to obtain the information on the position of the arm from a control circuitry of the robotic arm.

In various embodiments, the input data comprises imaging sensor data of an imaging sensor of a surgical microscope of the surgical microscope system. The system may be configured to detect the start or end of the surgery based on the imaging sensor data. Various aspects of the imaging sensor data may be used to determine, whether the surgical microscope is currently being used, and thus the start and/or end of a surgical procedure.

For example, the system may be configured to detect the presence of a patient within the imaging sensor data. The system may be configured to detect the start or end of the surgery based on the presence of the patient within the imaging sensor data. For example, if a patient becomes visible within the imaging sensor data, the start of the surgery may be detected, if the patient is not visible anymore within the imaging sensor data, the end of the surgery may be detected.

Alternatively or additionally, the (ambient) lighting may be analyzed to detect the start or end of the surgical procedure. For example, during surgery, the lighting may be focused on the patient, with other portions of the room receiving less light. Outside surgery, the lighting of the room may be more homogenic. In other words, the input data may comprise information on a lighting being used in an environment of the surgical microscope system. The system may be configured to detect the start or end of the surgery based on the information on the lighting being used in an environment of the surgical microscope system.

The start and end of the surgery are used to control the recording device. Accordingly, the system may be configured to provide the control signal to start a recording to be performed by the recording device if a start of a surgery is detected. The system may be configured to provide the control signal to stop the recording being performed by the recording in an end of a surgery is detected. Thus, the recording may be automatically started and/or stopped.

Embodiments of the present disclosure further provide a surgical microscope system comprising the above system, the one or more sensors or actors for providing the input data, and the recording device. Thus, the surgical microscope system may provide automated control of the recording device. Additionally, the surgical microscope system may comprise at least one of a surgical microscope, an arm being attached to the surgical microscope and an optical imaging sensor.

Embodiments of the present disclosure further provide a method for controlling a recording device of a surgical microscope system. The method comprises obtaining input data from one or more sensors or actors of the surgical microscope system. The method comprises detecting a start or an end of a surgery based on the input data. The surgery involves a use of the surgical microscope system. The method comprises providing a control signal to the recording device of the surgical microscope system based on the detected start or end of the surgery.

Embodiments of the present disclosure further provide a computer program with a program code for performing the method when the computer program is executed on a processor.

SHORT DESCRIPTION OF THE FIGURES

Some examples of apparatuses and/or methods will be described in the following by way of example only, and with reference to the accompanying figures, in which FIG. 1a shows a block diagram of an embodiment of a system for controlling a recording device of a surgical microscope system;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
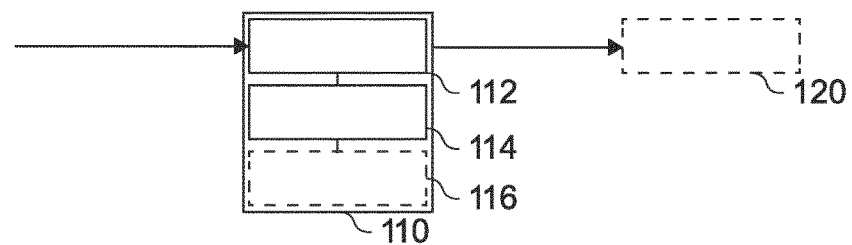
FIG. 1b shows a schematic diagram of an embodiment of a surgical microscope system.
FIGS. 1c and 1d show a more detailed schematic diagram of an embodiment of a surgical microscope system.

FIG. 1a shows a block diagram of an embodiment of a system 110 for controlling a recording device 120 of a surgical microscope system 100. The system comprises one or more processors 114 and an interface 112, which is coupled to the one or more processors. Optionally, the system further comprises one or more storage devices 116, which are also coupled to the one or more processors. In general, the functionality of the system 110 is provided by the one or more processors, in conjunction with the interface and/or the one or more storage devices.

The system is configured to obtain input data from one or more sensors or actors of the surgical microscope system via the interface. The system is configured to detect a start or an end of a surgery based on the input data. The surgery involves a use of the surgical microscope system (e.g. of a surgical microscope 140 of the surgical microscope system). The system is configured to provide a control signal to the recording device of the surgical microscope system via the interface based on the detected start or end of the surgery.

Figure 1B:
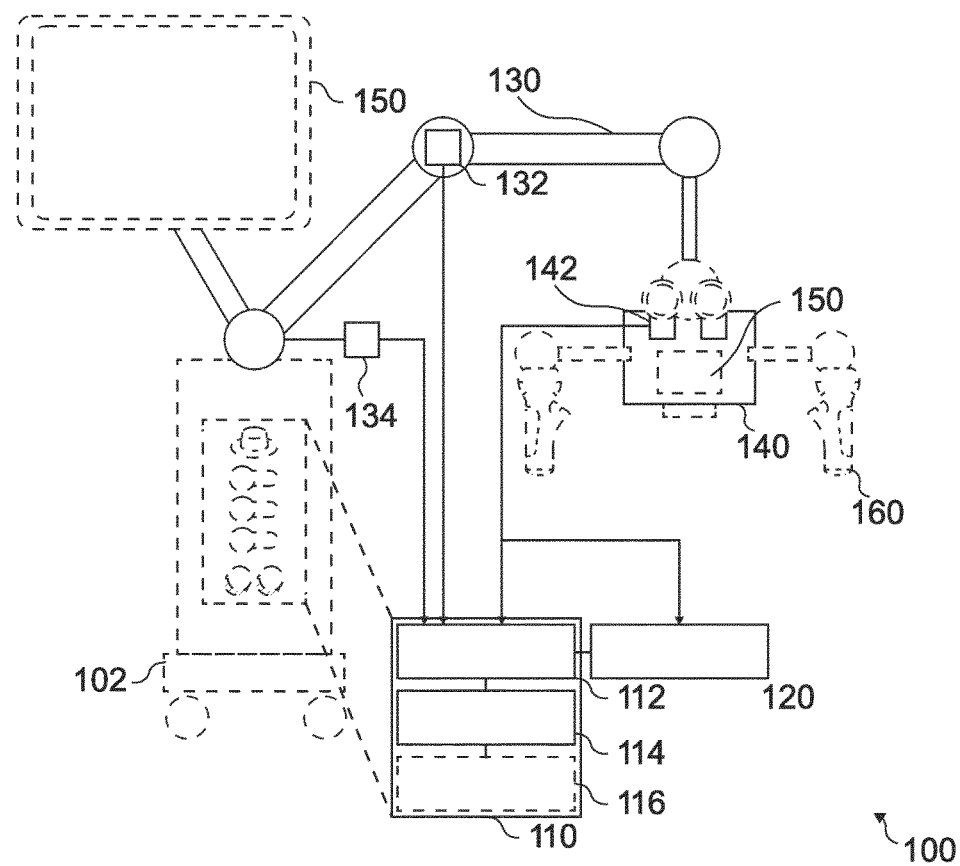

Embodiments of the present disclosure relate to a system, method and computer program for controlling a recording device 120 of a surgical microscope system 100, the surgical microscope system comprising a surgical microscope 140. In general, a microscope is an optical instrument that is suitable for examining objects that are too small to be examined by the human eye (alone). For example, a microscope may provide an optical magnification of a sample. In modern microscopes, the optical magnification is often provided for a camera or an imaging sensor, such as an optical imaging sensor 142 of the microscope 140 that is shown in FIG. 1b. The surgical microscope 140 may further comprise one or more optical magnification components that are used to magnify a view on the sample, such as an objective (i.e. lens).

Figure 1C:
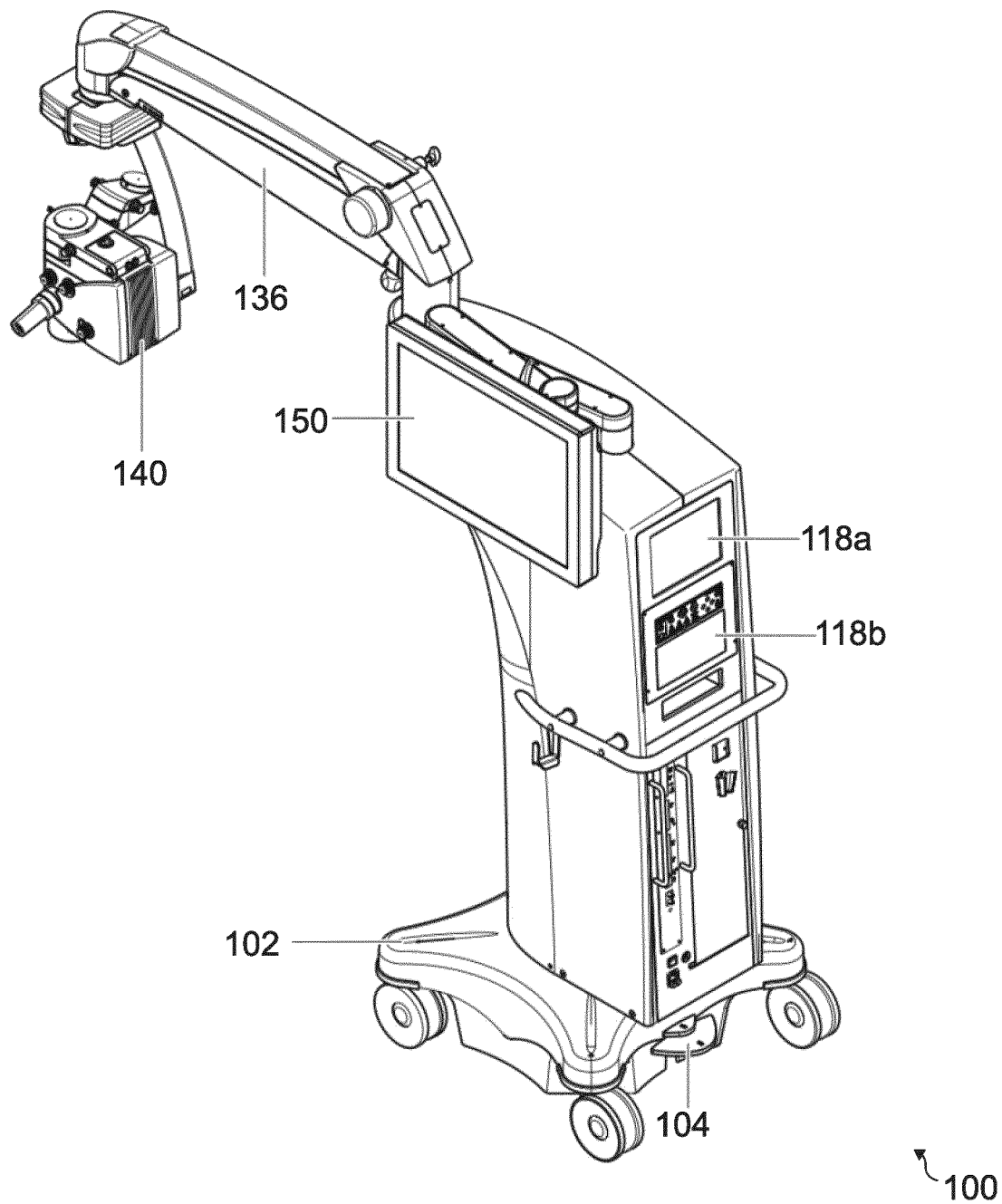
Figure 1D:
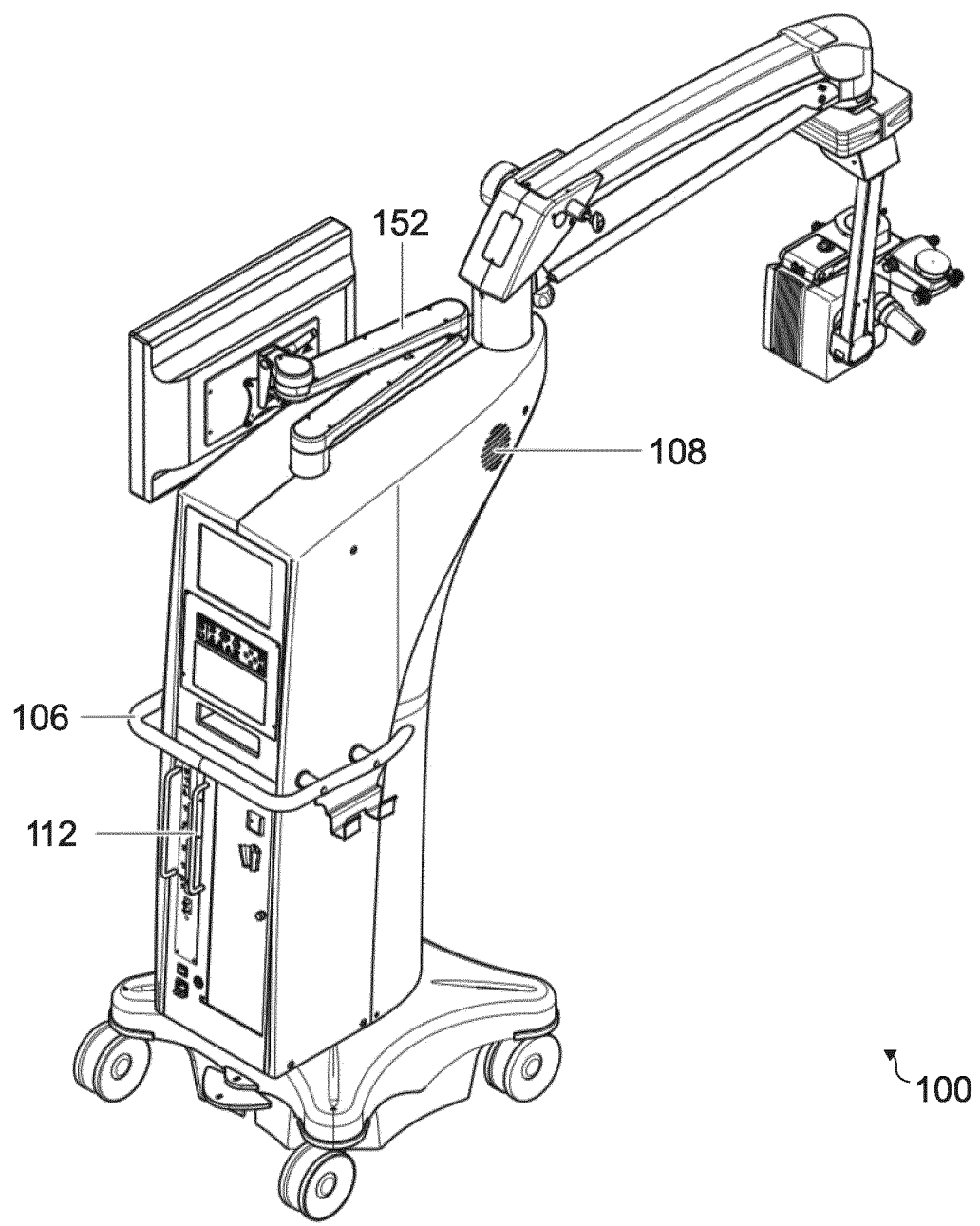

There are a variety of different types of microscopes. If the microscope is used in the medical or biological fields, the object being viewed through the microscope may be a sample of organic tissue, e.g. arranged within a petri dish or present in a part of a body of a patient. In embodiments, the microscope is a surgical microscope, i.e. a microscope for use during a surgical procedure. Such systems are shown in FIGS. 1b to 1d, for example. In FIG. 1b, a neurosurgical microscope system is shown, comprising a neurosurgical microscope. In FIGS. 1c and 1d, a surgical microscope for use in Ophthalmology (i.e. the diagnosis and treatment of eye disorders) is shown. Accordingly, an object being viewed through the microscope, and shown in the image data, may be a sample of organic tissue of a patient.

The above system 110 is suitable for use with the surgical microscope system 100. FIG. 1b shows a schematic diagram of an embodiment of a surgical microscope system 100. In FIG. 1b, a neurosurgical microscope system is shown. The surgical microscope system 100 comprises the system 110, the one or more sensors or actors 132; 134; 142 for providing the input data, and the recording device 120. The surgical microscope system comprises a surgical microscope 140 (a neurosurgical microscope in FIG. 1b), an arm 130 being attached to the surgical microscope, and an optical imaging sensor 142 of the surgical microscope (which is one of the one or more sensors for providing the input data). The surgical microscope system 100 shown in FIG. 1b comprises a number of optional components, such as a base unit 102 (comprising the system 110) with a (rolling) stand, one or more displays 150, a (robotic or manual) arm 130 which holds the microscope 140 in place, and which is coupled to the base unit 102 and to the microscope 140, and steering handles 160 that are attached to the microscope 140. In other words, the surgical microscope 140 of the surgical microscope system may be attached to the arm 130 of the surgical microscope system. One or more of the displays 150 may be part of the microscope 140, e.g. as auxiliary or as ocular displays. In the context of this application, the term "surgical microscope system" is used, in order to cover the portions of the system that are not part of the actual microscope (which comprises optical components), but which are used in conjunction with the microscope, such as the display or an illumination system.

FIGS. 1c and 1d show another type of surgical microscope system, a surgical microscope system for use in Ophthalmology. FIGS. 1c and 1d show a (more detailed) schematic diagram of an embodiment of a surgical microscope system for use in Ophthalmology. In FIGS. 1c and 1d, the surgical microscope 140 (also called "optics carrier") is shown, along with a parallelogram 136 of the arm of the surgical microscope system. The surgical microscope system of FIGS. 1c and 1d further comprises a display/video monitor 150 with an optional monitor arm 152, the base unit 102, a footbrake 104 and a handrail 106. In the surgical microscope system 100 of FIGS. 1c, control units 118a and 118b are included, for controlling the system 110 and/or for controlling the camera and video. Furthermore, interface 112 is shown, which may provide terminals (electrical, video, etc.). Furthermore, the surgical microscope system of FIGS. 1c and 1d comprises a speaker 108, which is part of the base unit 102.

In general, the system is configured to detect the start or the end of a surgery based on the input data of one or more sensors or actors. Accordingly, the system is configured to obtain, e.g. to receive or read out, the respective input data from the one or more sensors and actors. For example, the input data may be obtained by receiving the input data from the one or more sensors or actors (e.g. via the interface 112), by reading the input data out from a memory of the one or more sensors or actors (e.g. via the interface 112), or by reading the input data from a storage device 116 of the system 110, e.g. after the input data has been written to the storage device 116 by the one or more sensors or actors or by another system or processor.

In general, input data of different types of sensors and actors may be used to determine the start or end of the surgery (i.e. surgical procedure). For once, the positioning and/or orientation of the arm 130 of the surgical microscope system may be indicative of a surgery being performed. Accordingly, the system may be configured to obtain (at least a portion of) the input data from a positioning sensor 132 of the arm 130 (e.g. if the arm is an arm that is put in place manually by the surgeon), or the arm may be a robotic arm, in which case the system may be configured to obtain (at least a portion of) the input data from a control circuitry 134 (i.e. a part of an actor system) of the robotic arm. In other words, the one or more sensors or actors of the surgical microscope system may comprise a positioning sensor 132 for determining the position of the arm, e.g. a hall effect-based positioning sensor or a rotary encoder. The system may be configured to obtain information on the position of the arm from the positioning sensor 132. Alternatively, the system is configured to obtain the information on the position of the arm from the control circuitry 134 of the robotic arm. In some embodiments, the imaging sensor 142 of the surgical microscope may be used to determine the start or end of a surgical procedure. Accordingly, the system may be configured to obtain (at least a portion of) the input data, e.g. imaging sensor data, from the imaging sensor 142 of the surgical microscope. Also, the surgical lighting or ambient lighting may be analyzed to determine, whether a surgical procedure is being started or terminated. Accordingly, the system may be configured to obtain (at least a portion of) the input data from a control circuitry of a lighting system, or to use the imaging sensor data of the imaging sensor 142 of the microscope 140.

Based on the input data, the system is configured to detect a start or an end of the surgery (or surgical procedure), which involves a use of the surgical microscope system, e.g. of the surgical microscope of the surgical microscope system. In other words, the surgical microscope of the surgical microscope system may be in use during (at least most of the time of) the surgery. For example, the surgery may be performed using the surgical microscope, i.e. with the help of the surgical microscope. Accordingly, the input data may (implicitly) indicate the use of the surgical microscope system during surgery. The system may now be used to detect marks that indicate that the surgical microscope (system) is being used in a surgery, and thus the start and/or and of the surgery. These marks may be implicit marks, i.e. they may implicitly indicate the start and/or end of the surgery. In other words, the input data may be analyzed to detect evidence for the start and/or end of the surgery. In various examples, the detection of the start and/or end of the surgery might not be based on the detection of a manual activation and/or deactivation of the recording. There are different marks that may be used (to detect the start and/or end of the surgery), as indicated in the previous section.

One major mark is the positioning and/or orientation of the arm of the surgical microscope system, and thus the positioning of the surgical microscope itself. Accordingly, the input data may comprise information on a position of an arm 130 of the surgical microscope system. For example, the information on the position of the arm may comprise information on the vertical and lateral orientation of the arm, and/or information on a position of the surgical microscope attached to the arm. In other words, the information on the position of the arm may comprise information on a vertical position and/or lateral position of the surgical microscope that is attached to the arm. This information may be used to detect a start or end of the surgery. Accordingly, the system may be configured to detect the start or end of the surgery based on the information on the position of the arm. For example, if the position of the arm (and thus of the surgical microscope) is changed to a first range of positions, the start of the surgery may be detected, and if the position of the arm (and thus of the surgical microscope) is changed to a second range of positions, the end of the surgery may be detected. For example, the first range of positions may be indicative of the start of the surgery (or of the surgery being in progress), e.g. due to the positions of the first range being in proximity to the operating table, and the second range of positions may be indicative of the end of the surgery (or of no surgery being performed).

The two ranges of positions may be defined along the vertical position (i.e. height above a reference level, such as the ground or the patient) of the surgical microscope. In other words, the system may be configured to detect the start or end of the surgery based on the information on the vertical position of the surgical microscope. For example, if the surgical microscope is lowered (and thus brought into closer proximity to the patient/surgical site of the patient), the position may be indicative of the surgery being started or in progress, if the surgical microscope is put at a higher vertical position (and thus further away from the patient/surgical site), the position may be indicative of the surgery being terminated or finished. Accordingly, the system may be configured to detect the start of a surgery after the vertical position of the surgical microscope is lowered below a threshold (e.g. below a first lower threshold), and to detect the end of the surgery after the vertical position of the surgical microscope is increased above a threshold (e.g. a second higher threshold). Accordingly, the vertical positions of the surgical microscope below the (first lower) threshold may correspond to the first range of positions, and vertical positions above the (second higher) threshold may correspond to the second range of transitions.

In some cases, a surgeon might move the surgical microscope out of the way during a surgical procedure, e.g. to perform a portion of the surgery where an overall view of the surgical site may be preferred, or to move in an additional surgical tool or remove a previously used tool. It may be desirable to hold off terminating the recording in such cases, as one continuous recording of the surgical procedure may be required. If the surgery is merely recorded using the imaging sensor of the surgical microscope, this may be bearable, as the recording might only show out of focus images. Oftentimes, however, recording is performed using multiple cameras (including the imaging sensor of the surgical microscope), e.g. to preserve everything happening in the operating room. Thus, the recording might not be terminated as soon as the surgical microscope is moved away from the patient. Accordingly, a timer may be used to delay detecting the end of the surgery until after the timer has expired. In other words, the system may be configured to detect the end of the surgery if the surgical microscope remains above the threshold for at least a pre-defined time interval.

Other factors may be taken into account as well. For example, as introduced earlier, the imaging sensor data provided by the imaging sensor of the surgical microscope being out of focus may also indicate, that the surgery has ended. Accordingly, the system may be configured to detect the end of the surgery if the surgical microscope remains above the threshold and the imaging sensor data is out of focus for at least a pre-defined time interval. The system may be configured to determine whether the imaging sensor data is out of focus, e.g. by determining a contrast of the imaging sensor data, and comparing the contrast to a threshold value. A higher contrast typically indicates that the imaging sensor data is in focus. Alternatively, a built-in functionality of the imaging sensor may be used.

As has been introduced before, the orientation of the arm, and in particular of the parallelogram section of the arm, may also be indicative of whether surgery is currently being performed. In general, the parallelogram section of the arm is the section of the arm that enables a vertical adjustment of the position of the surgical microscope, without changing an angle (above ground/patient) of the surgical microscope. In many implementations, the parallelogram section comprises a compression spring, or a hydraulic system, which supports changing the position of the surgical microscope. The information on the position of the arm may comprise information on an orientation of the parallelogram section of the arm, and thus the (vertical and/or horizontal) position of the surgical microscope being attached to the arm. The system may be configured to detect the start or end of the surgery based on the information on the orientation of the parallelogram section of the arm. For example, the parallelogram section may comprise an "active" orientation (during surgery), which may be at a first angle (or range of angles) and/or vertical height (above the patient), and a "parked" orientation, which may be at a second angle (or range of angles) away from the patient and/or a vertical height further away from the patient/operating table (see FIGS. 3a and 3b). Accordingly, the position of the surgical microscope with the parallelogram section being in the active orientation may be within the first range of positions, and the position of the surgical microscope with the parallelogram section being in the parked orientation may be within the second range of positions. The system may be configured to detect the start of the surgery if the parallelogram section is moved into the active orientation, and to detect the end of the surgery if the parallelogram section is moved into the parked orientation (e.g. for at least a pre-defined time interval, and/or if the imaging sensor data is out of focus for at least a pre-defined time interval).

In various embodiments, the input data comprises imaging sensor data of an imaging sensor 142 of a surgical microscope of the surgical microscope system. For example, the system may be configured to obtain imaging sensor data from the optical imaging sensor 142 of the microscope. For example, the optical imaging sensor 142 may comprise or be an APS (Active Pixel Sensor)—or a CCD (Charge-Coupled-Device)-based imaging sensor. For example, in APS-based imaging sensors, light is recorded at each pixel using a photo-detector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensors by a control circuitry of the imaging sensors to perform the imaging.

The system may be configured to detect the start or end of the surgery based on the imaging sensor data (which may originate from the imaging sensor of the surgical microscope and/or from one or more additional imaging sensors, e.g. cameras, placed in the environment of the surgical microscope system). For example, in some embodiments, the imaging sensor data may show a patient on the operating table if the surgical microscope is placed above the patient during surgery, which is a reliable indicator for surgery being in progress or being started. Accordingly, the system may be configured to detect the presence of a patient within the imaging sensor data. The system may be configured to detect the start or end of the surgery based on the presence of the patient within the imaging sensor data. For example, the system may detect the start of the surgery if or when the patient is detected with the imaging sensor data is (first) detected, and an end of the surgical procedure, if a the patient is not detected anymore, or if the removal of the patient from the operating table is detected.

Another mark or indicator is the lighting of the operating room. During surgery, usually, ambient light is reduced or switched off, and the lighting is focused on the patient. In between surgeries, the ambient light is switched on, e.g. to enable replacing sterile covers of the surgical setup. Accordingly, the system may be configured to analyze the lighting situation to detect the start or end of the surgery. In other words, the input data may comprise information on a lighting being used in an environment of the surgical microscope system (e.g. in the operating room). For example, the imaging sensor data of the imaging sensor of the surgical microscope (or of another imaging sensor, e.g. of a camera having a field of view covering the surgical team) may comprise the information on the lighting being used in the environment of the surgical microscope system. Alternatively or additionally, the system may be configured to obtain (at least a portion of) the information on the lighting being used in the environment of the surgical microscope system from a control circuitry of the lighting system of the surgical microscope system and/or of the operating room. The system may be configured to detect the start or end of the surgery based on the information on the lighting being used in the environment of the surgical microscope system. For example, the system may be configured to detect the start of the surgery if the information on the lighting being used in the environment of the surgical microscope system indicates that the ambient light is reduced or switched off, and the lighting is focused on the patient. The system may be configured to detect the start of the surgery if the information on the lighting being used in the environment of the surgical microscope system indicates that the ambient light is switched on increased, and/or if the lighting system of the surgical microscope system is reduced or switched off.

The system is configured to provide the control signal to the recording device of the surgical microscope system via the interface based on the detected start or end of the surgery. In general, the control signal may be a digital signal, such as digitally transmitted packet, or an analog signal, such as an analog current signal. The control signal may be suitable for triggering the recording device to start or end the recording. For example, different digital bit values may be transmitted, or different analog voltages or currents may be applied to trigger the recording device to start or stop the recording. The system may be configured to provide the control signal to start a recording to be performed by the recording device if a start of a surgery is detected, and to provide the control signal to stop the recording being performed by the recording in an end of a surgery is detected. Accordingly, the recording device may be configured to start or stop recording based on the control signal. The recording device may be configured to record the imaging sensor data of the imaging sensor of the surgical microscope. Additionally (or alternatively), the recording device may be configured to record imaging sensor data of one or more additional imaging sensors (i.e. cameras) being placed in the environment of the surgical microscope systems, e.g. cameras having a field of view that covers the surgical time and/or the entire surgical site. The recording device may save a separate digital file for each recording, the digital file comprising the respective recording (e.g. within a storage module).

The interface 112 may correspond to one or more inputs and/or outputs for receiving and/or transmitting information, which may be in digital (bit) values according to a specified code, within a module, between modules or between modules of different entities. For example, the interface 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system and microscope system are mentioned in connection with the proposed concept or one or more examples described above or below (e.g. FIG. 2 to 4). The system and microscope system may comprise one or more additional optional features corresponding to one or more aspects of the proposed concept or one or more examples described above or below.

Figure 2:
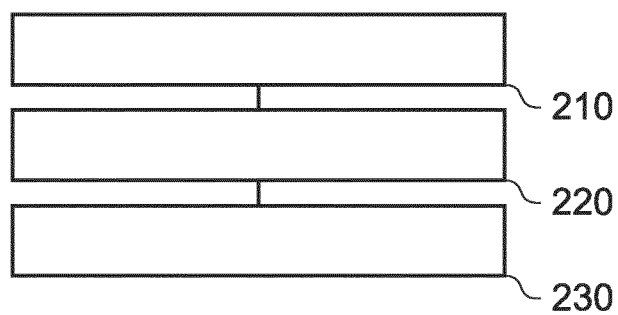
FIG. 2 shows a flow chart of a method for controlling a recording device of a surgical microscope system.

FIG. 2 shows a flow chart of a corresponding method for controlling a recording device of a surgical microscope system. The method comprises obtaining 210 input data from one or more sensors or actors 132; 134; 142 (as shown in FIGS. 1a to 1d) of the surgical microscope system. The method comprises detecting 220 a start or an end of a surgery based on the input data, the surgery involving a use of the surgical microscope system. The method comprises providing 230 a control signal to the recording device 120 of the surgical microscope system based on the detected start or end of the surgery.

As indicated above, features described in connection with the system 110 and the microscope system 100 of FIGS. 1a to 1d may be likewise applied to the method of FIG. 2.

More details and aspects of the method are mentioned in connection with the proposed concept or one or more examples described above or below (e.g. FIG. 1a to 1d, 3a to 4). The method may comprise one or more additional optional features corresponding to one or more aspects of the proposed concept or one or more examples described above or below.

Various embodiments of the present disclosure relate to a workflow for automated case recording. Embodiments may thus provide a concept for automated recording (e.g. of a surgical procedure.

As has been introduced before, the ophthalmology case volume often is high. Improving efficiency and turnover in the operating room can result in the ability to help more patients per day. This is particularly relevant for cataract surgery. By setting the automated video recording preference, recording can start and stop intuitively without any additional manual step.

Various embodiments relate to an automated recording feature, which is linked to an orientation of a parallelogram. In particular, an integration of video recording functionality based on the position of the parallelogram in "parking" or "operation" (i.e. active) mode may be provided. Thus, video recording start and stop may be performed automatically integrated as part of the surgical workflow. The surgeon may free up the video recording footswitch control for other functionality usage.

Figure 3A:
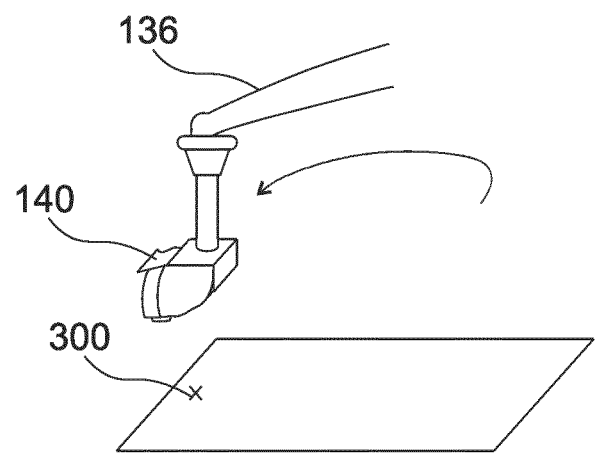
FIGS. 3a and 3b show schematic diagrams of a surgical microscope system in active position and in parked position.
Figure 3B:
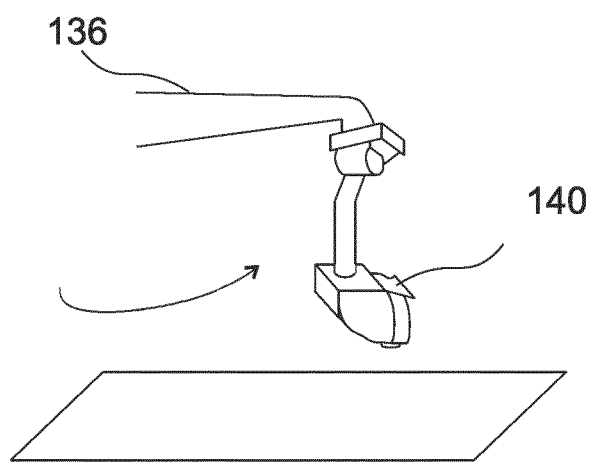
Figure 4:
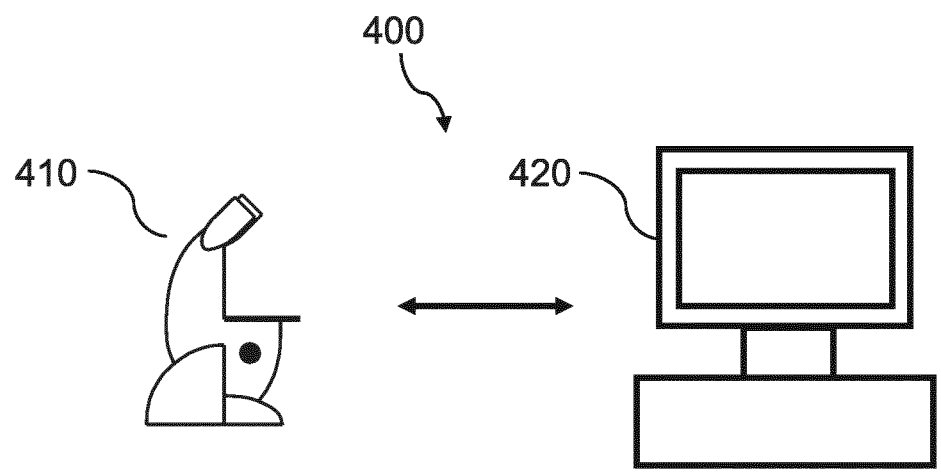
FIG. 4 shows a schematic diagram of a system comprising a microscope and a computer system.

FIGS. 3a and 3b show schematic diagrams of a surgical microscope system in active position and in parked position. FIGS. 3a and 3b show the surgical microscope 140 and the parallelogram section 136 of the arm, and a patient 300. If the parallelogram is moved into position for surgery (FIG. 3a), the parallelogram, and thus the surgical microscope, may be in operation mode, and the video recording may start. When parallelogram is moved to parked position after surgery (FIG. 3b, e.g. away from the patient), video recording may stop. A timer countdown may be set to end the case.

More details and aspects of the concept are mentioned in connection with the proposed concept or one or more examples described above or below (e.g. FIG. 1a to 2, 4). The concept may comprise one or more additional optional features corresponding to one or more aspects of the proposed concept or one or more examples described above or below.

Some embodiments relate to a microscope comprising a system as described in connection with one or more of the FIGS. 1 to 3b. Alternatively, a microscope may be part of or connected to a system as described in connection with one or more of the FIGS. 1 to 3b. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Surgical microscope system
102 Base unit
104 Footbrake
106 Handrail
108 Speaker
110 System
112 Interface
114 One or more processors
116 One or more storage devices
118a Control unit for system
118b Control unit for camera and video
120 Recording device
130 Arm
132 Positioning sensor
134 Control circuitry of the arm
136 Parallelogram section
140 Surgical microscope
150 Displays
152 Monitor arm
160 Steering handles
210 Obtaining input data
220 Detecting a start or end of a surgery
230 Providing a control signal
300 Patient
400 System
410 Microscope
420 Computer system

The invention claimed is:

1. A system for controlling a recording device of a surgical microscope system, the system comprising one or more processors and an interface, wherein the system is configured to:
    obtain input data from one or more sensors or actors of the surgical microscope system via the interface;
    detect a start or an end of a surgery based on the input data, the surgery involving a use of the surgical microscope system; and
    provide a control signal to the recording device of the surgical microscope system via the interface based on the detected start or end of the surgery,
    wherein the input data comprises information on a position of an arm of the surgical microscope system, and the system is configured to detect the start or end of the surgery based on the information on the position of the arm,
    wherein the arm of the microscope system comprises a parallelogram section, and the information on the position of the arm comprises information on an orientation of the parallelogram section of the arm, and the system is configured to detect the start or end of the surgery based on the information on the orientation of the parallelogram section of the arm.

2. The system according to claim 1, wherein a surgical microscope of the surgical microscope system is attached to the arm of the surgical microscope system, wherein the information on the position of the arm comprises information on a vertical position of the surgical microscope, wherein the system is configured to detect the start or end of the surgery based on the information on the vertical position of the surgical microscope.

3. The system according to claim 2, wherein the system is configured to detect the start of a surgery after the vertical position of the surgical microscope is lowered below a threshold, and to detect the end of the surgery after the vertical position of the surgical microscope is increased above a threshold.

4. The system according to claim 3, wherein the system is configured to detect the end of the surgery if the surgical microscope remains above the threshold for at least a pre-defined time interval.

5. The system according to claim 3, wherein the input data comprises imaging sensor data of an imaging sensor of the surgical microscope, wherein the system is configured to detect the end of the surgery if the surgical microscope remains above the threshold and the imaging sensor data is out of focus for at least a pre-defined time interval.

6. The system according to claim 1, wherein the one or more sensors or actors of the surgical microscope system comprise a positioning sensor for determining the position of the arm, wherein the system is configured to obtain the information on the position of the arm from the positioning sensor.

7. The system according to claim 1, wherein the arm is a robotic arm, wherein the system is configured to obtain the information on the position of the arm from a control circuitry of the robotic arm.

8. The system according to claim 1, wherein the input data comprises imaging sensor data of an imaging sensor of a surgical microscope of the surgical microscope system, wherein the system is configured to detect the start or end of the surgery based on the imaging sensor data.

9. The system according to claim 8, wherein the system is configured to detect the presence of a patient within the imaging sensor data, wherein the system is configured to detect the start or end of the surgery based on the presence of the patient within the imaging sensor data.

10. The system according to claim 1, wherein the input data comprises information on a lighting being used in an environment of the surgical microscope system, wherein the system is configured to detect the start or end of the surgery based on the information on the lighting being used in an environment of the surgical microscope system.

11. The system according to claim 1, wherein the system is configured to provide the control signal to start a recording to be performed by the recording device if a start of a surgery is detected, and to provide the control signal to stop the recording being performed by the recording in an end of a surgery is detected.

12. A surgical microscope system comprising the system according to claim 1, the one or more sensors or actors for providing the input data, and the recording device.

13. A method for controlling a recording device of a surgical microscope system, the method comprising:
obtaining input data from one or more sensors or actors of the surgical microscope system;
detecting a start or an end of a surgery based on the input data, the surgery involving a use of the surgical microscope system; and
providing a control signal to the recording device of the surgical microscope system based on the detected start or end of the surgery,
wherein the input data comprises information on a position of an arm of the surgical microscope system, and the start or end of the surgery is detected based on the information on the position of the arm,
wherein the arm of the microscope system comprises a parallelogram section, and the information on the position of the arm comprises information on an orientation of the parallelogram section of the arm, and the start or end of the surgery is detected based on the information on the orientation of the parallelogram section of the arm.

14. A non-transitory, computer-readable medium comprising a program code that, when the program code is executed on a processor, a computer, or a programmable hardware component, causes the processor, computer, or programmable hardware component to perform the method of claim 13.

* * * * *